Patented Oct. 8, 1935

2,016,821

UNITED STATES PATENT OFFICE 2,016,821

COAL TREATING PROCESS AND COMPOUND

Joseph C. Nelms, East Cleveland, Ohio

No Drawing. Application October 22, 1932, Serial No. 639,156

5 Claims. (Cl. 44—6)

This invention relates to a process of treating coal for the purpose of improving its ash and burning characteristics to make usable in modern boilers certain coals which at present are not suitable for such use.

Certain coals, as mined and ordinarily placed upon the market, especially certain bituminous coals mined in Ohio, have limited usefulness due to the fact that when burned in modern high pressure steam boilers or under high temperature conditions, objectionable clinkering occurs, with the production of a more or less glassy slag-like ash that not only interferes with manipulation of the ash but also coats the grate bars, or, in more serious situations, actually causes the grate bars or other metal parts to burn through.

The present invention has for its object to so treat such coals as to alter the composition of the ash in a manner to raise its fusing point, or, more accurately, to enable the fusing point of the ash within a reasonable range to be so manipulated or altered at will as to permit coal of the kind described to be satisfactorily used not only under moderate temperature requirements, but also where higher temperatures are encountered in power plant operations.

For the purpose stated, my process consists in incorporating or mixing with the coal a suitable material for raising the fusing point of its ash. Aluminum oxide is a suitable material for the purpose, particularly when used in proper form and produced from a source of suitable material. Of course, the addition of an incombustible material, such as aluminum oxide, to coal, would be expected to lower its efficiency as regards the production of heat units, so that other things being equal, the less such material is added to the fuel the better. In addition, the cost for the added material is a material factor because aluminum oxide is relatively expensive as compared with bituminous coal. Taking these factors into consideration, I find that satisfactory results can be secured by the use of a more or less cheap source of aluminum oxide, to wit, bauxite, a natural hydrated mixture of aluminum and iron oxides. This material is ordinarily used as raw material in the production of aluminum, as well as for other uses. The bauxite mined in France runs as high as 75% $Al_2O_3$ but is usually too expensive for use in treating coal. For my purposes a satisfactory material is the bauxite mined in Arkansas and in Alabama.

These materials have compositions approximately as follows:—

|  | Arkansas bauxite | Alabama bauxite |
|---|---|---|
|  | Percent | Percent |
| $Al_2O_3$ | 58–59 | 57–58 |
| $Fe_2O_3$ | 3– 4 | 1– 1.5 |
| $SiO_2$ | 7–10 | 9–12 |
| $TiO_2$ | 2.7 | 2.5 |
| Loss on ignition | 25 | 28–30 |
| Free moisture | 2 |  |

The greater the alumina ($Al_2O_3$) content of the material used, the less is needed, because it is essentially the alumina which has the effect of raising the fusing point of the ash. On the other hand, practical considerations have been found to point to the use of natural bauxite ground to suitable fineness, say to 100 mesh or the like. The natural bauxite is readily ground or milled and makes a fair suspension with the proper amount of water, so that it can be sprayed or sprinkled over the coal in liquid form, whereas the same bauxite, calcined to remove its water of hydration and free moisture, is found to become quite hard and gritty so that it is not only difficult to grind, but it also has other objectionable characteristics.

As a consequence, I employ for the purpose described raw or natural bauxite in ground form. By the use of such material an ordinary low fusion coal with an ash which fuses around 2100° F. may be converted to either a medium fusion coal with an ash fusing around 2500° F. or even higher, and, in this manner, by graduated additions of various amounts of bauxite in accordance with the requirements at the place of use, the coal may be converted into a form suitable to meet practically any conditions encountered in modern power plants.

The bauxite or aluminum oxide is added in various amounts, all calculated on the basis of the ash content or constituents of the coal. Coals of this type approximate 6% ash, or in other words, in a ton of 2000 lbs. the ash content will run 120 lbs. The bauxite is added in the amount of approximately 6% of the ash content, or, in other words, in the amount of 7.2 lbs. where the ash content is 6% of the weight of the coal. With this amount of bauxite, it is possible to raise the fusing temperature at least 200° F., if not more. Bauxite added in larger amounts, up to say 10% to 12%, will further elevate the fusing temperature but in a decreasing amount, and beyond 10% or 12% further additions of bauxite not only are not beneficial in that they produce no further significant elevation of the fusing temperature, but also entail an unwarranted and needless expenditure for the additional bauxite.

Analyses of a very carefully prepared composite sample of coal of the kind described, the sample being gathered and made up to include portions from forty different cars, were as follows, the treated coal having been treated with bauxite, prepared as stated, in the amount of 6% of the weight of the ash constituents of the fuel:—

|  | Treated coal | Untreated coal |
| --- | --- | --- |
|  | Percent | Percent |
| Silica (SiO$_2$) | 37.15 | 36.00 |
| Iron oxide (Fe$_2$O$_3$) | 34.15 | 38.90 |
| Alumina (Al$_2$O$_3$) | 22.95 | 18.94 |
| Titania (TiO$_2$) | 1.43 | 1.36 |
| Lime (CaO) | .85 | 1.10 |
| Magnesia (MgO) | .30 | .37 |
| Alkalies (Na$_2$O and K$_2$O) | 1.66 | 1.41 |
| Sulphuric anhydride (SO$_3$) | 1.15 | 1.51 |
| Phosphoric anhydride (P$_2$O$_5$) | .24 | .26 |
|  | 99.88 | 99.85 |

It will be noted that as the result of treatment of the coal with bauxite, the content of silica increased slightly, the content of iron oxide decreased, and the content of alumina increased 4%. The ash of the untreated coal, by careful test, reached the fusion point at 2180° F., while the treated coal reached the fusion point at 2335° F.

This same lot of coal,—indeed, the same sample,—was found to have further characteristics, as follows:—

|  | Treated coal | Untreated coal |
| --- | --- | --- |
|  | Percent | Percent |
| Moisture | 2.10 | 1.75 |
| Volatile matter | 40.00 | 40.75 |
| Fixed carbon | 51.17 | 51.05 |
| Ash | 6.73 | 6.45 |
|  | 100.00 | 100.00 |
| Sulphur | 2.83 | 2.87 |
| B. t. u. (dry basis) | 13,888 | 13,851 |

In order to process the coal to meet the requirements I not only use bauxite powdered or pulverized to small size, say 100 mesh, and suspended in water, but I also prefer to add some suitable material for causing the bauxite to adhere to the coal so that it will not be washed out by rain, snow, or weather conditions in transit from the mine to the place of use. A suitable substance for the purpose is ordinary sodium silicate in small quantities. I further may use a small proportion of lamp black or other black combustible material to blacken the bauxite so that its otherwise white appearance on the coal will not interfere with sale. A typical formula for a mixture for treating coal according to my invention is as follows:—

| Bauxite | 6 lbs. |
| --- | --- |
| Sodium silicate | ¼ lb. |
| Powdered coal or lamp black | 2¾ lbs. |
| Water | 2 gallons |

The above mixture is sufficient to treat one ton of coal and it is applied by spray nozzles or otherwise as a liquid mixture, care being taken to keep it thoroughly mixed while being applied.

What I claim is:

1. A process of treating coal, consisting in uniformly applying to the surface of the coal a liquid mixture of alumina bearing material having an alumina content of three to six percent of the weight of the ash of the coal, and having sodium silicate in small proportion to the coal but sufficient to effectively bind the alumina bearing material to the surface of the coal, and whereby when dried it forms a hardened moisture resisting coating on the coal and which has the effect of raising the fusion point of the ash.

2. A process of treating coal, consisting of preparing a liquid mixture of alumina bearing material with sodium silicate and applying the same to the coal by spraying or the like to cover the surfaces thereof and in such proportion that the alumina in the coating on the coal shall be between three and six percent of the weight of the ash to result from burning the coal and whereby the fusion point of the ash is raised from ten to twenty-five percent.

3. A process of treating coal consisting of preparing a liquid mixture having powdered alumina bearing material and a small percentage of ordinary sodium silicate, and spraying the liquid mixture upon the coal to thoroughly cover the same, resulting in a glazed surface in which the sodium silicate effectively binds the alumina bearing material to the coal, and in which the proportion of alumina is between two-tenths of one percent and four-tenths of one percent of the weight of the coal.

4. The method of treating coal to raise the fusion point of the ash by applying alumina to the surface thereof, consisting of mixing powdered alumina bearing material with water with a small percentage of ordinary sodium silicate and then while held in suspension spraying the same onto the coal to thoroughly cover the surface, and in which the sodium silicate effectively binds the alumina bearing material to the surface of the coal, the weight of the alumina being approximately four pounds to each ton of coal.

5. A composition for coating coal consisting of powdered alumina bearing material and sodium silicate, adapted to form on the surface of the coal a film of glaze of a substantially water proof nature and in which the alumina is present in an amount between four to eight pounds per ton of two thousand pounds.

JOSEPH C. NELMS.